United States Patent [19]
Garcea

[11] 3,844,371
[45] Oct. 29, 1974

[54] ANTI-SKID DEVICE FOR MOTOR VEHICLES

[75] Inventor: Giampaolo Garcea, Milan, Italy
[73] Assignee: Alfa Romeo, S.p.A., Milan, Italy
[22] Filed: Oct. 15, 1971
[21] Appl. No.: 189,720

[30] Foreign Application Priority Data
Oct. 19, 1970 Italy.......................... 31182/70

[52] U.S. Cl........... 180/77 R, 180/82 R, 188/181 A
[51] Int. Cl............................................ B60t 8/16
[58] Field of Search............... 180/77 R, 82, 105 R; 188/181 R, 181 A; 303/21 CG, 2 H, 21 F

[56] References Cited
UNITED STATES PATENTS

| | | | |
|---|---|---|---|
| 1,799,898 | 4/1931 | Hallot............................. | 303/21 CG |
| 2,107,823 | 2/1938 | Hallot............................. | 188/181 A |
| 2,225,315 | 12/1940 | McCollum...................... | 303/24 R X |
| 2,818,244 | 12/1957 | Ropar............................ | 188/181 A X |
| 2,920,924 | 1/1960 | Reswick et al................. | 188/181 A X |
| 3,165,180 | 1/1965 | Inderau......................... | 188/181 A X |

FOREIGN PATENTS OR APPLICATIONS

| | | | |
|---|---|---|---|
| 1,070,934 | 12/1959 | Germany........................ | 180/77 R |
| 2,004,690 | 3/1969 | Germany........................ | 180/77 R |

Primary Examiner—Kenneth H. Betts
Attorney, Agent, or Firm—Holman & Stern

[57] ABSTRACT

An improved antiskid mechanism for motor vehicles which conventionally comprises means responsive to the speed differentials of the driving wheels and means for converting the speed variations, as sensed, into axial shifts of an axially movable body, said body being active on means which regulate the driving torque applied to the driving wheels, the improvement consisting in that the speed-differential responsive means and the conversion means comprises a first rotatable body keyed to a shaft which is rotated at a speed proportional to that of the driving wheels, e.g., the cardan shaft or a shaft connected therewith, and a second rotatable member, capable of being displaced also axially and integral with said first axially movable body so as to be translated as an entity therewith, said members being maintained in mutual engagement of rotation, so that every variation of the angular speed of the first rotatable body which exceeds a predetermined limiting value is converted into an axial shift of the second rotatable and axially displaceable member, and, consequently, of said first axially movable body.

6 Claims, 3 Drawing Figures

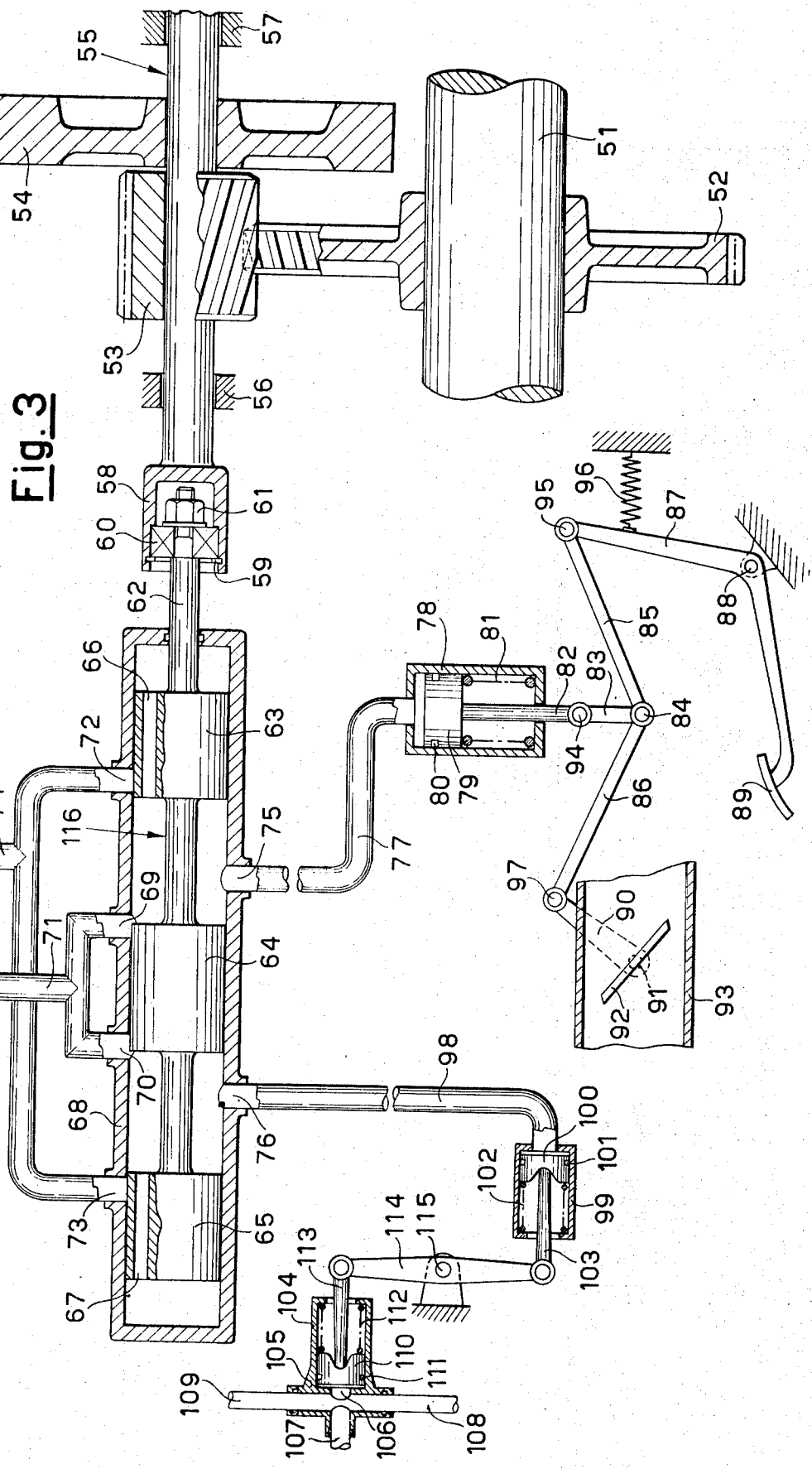

ANTI-SKID DEVICE FOR MOTOR VEHICLES

BACKGROUND OF THE INVENTION

This invention relates to a device which can be applied to a motor vehicle in order to prevent skidding thereof during an acceleration and/or a braking stage.

It is known that, whenever the motive, or braking torque applied to a motor vehicle as the latter is subjected to an acceleration, or, braking, respectively, goes beyond a certain limiting value which is a function of the product of the vehicle weight insisting on the wheels, by the friction coefficient between the wheels and the ground (the latter varies as the conditions of both the tire and the ground are varied), skidding takes place, which can have serious troubles caused both to the vehicle and its driver.

Usually, the driver himself, on the basis of his driving skill, adjusts either the motive or the braking torque so as to adapt it to the several conditions under which he is occasionally working. However, it often occurs that, either due to an erroneous estimate of the conditions of the ground, or due to disturbed psychical and physical conditions of the driver, skiddings may take place, which are likely to become a source of accidents.

PRIOR ART

In order that such a shortcoming may be overcome, there have been recently developed a few devices capable of detecting a possible skidding condition and, if so, of automatically adjusting either the motive or the braking torque as applied to the vehicle wheels until skidding is overcome. A device which is capable of overcoming skidding during an acceleration is, for example, the one described in German Pat. No. 1.070.934, wherein appropriate detecting and comparison means are provided, which detect the speed of rotation of the driving wheels and the driven wheels, compare them and, in case they are found different (obviously due to skidding of the motive wheels), switch axially a slider from an idle position to a working position, in which a source of pressurized fluid is placed into communication with a cylinder in whose interior a piston slides, which is mechanically connected to the throttle so as to close it every time that the piston is actuated by said pressurized fluid. A device capable of preventing both the skidding during acceleration and the skidding during braking is, conversely, one disclosed in French Pat. application No. 2.004.690, according to which a generator of electrical pulses, so arranged as to be responsive to the angular acceleration of the driving wheels, is connected to a torque reducer so as to control the actuation thereof every time that an excess torque causes, along with the skidding of the wheels, an angular acceleration which exceeds a certain limiting value.

According to this invention, there has now been embodied an antiskid device for vehicles, which partly starts from the teachings of the above mentioned German Patent, to which it adds a few substantial improvements adapted to simplify the construction, and, consistently with the above cited French Pat. application, render easy to employ it during the possible use also for overcoming skid during braking, the more so that, with the device according to the German Patent alone, this is in no wise possible inasmuch as the detecting and comparing means as provided by the German Patent aforementioned are capable, at most, of detecting only differential skiddings of the driving wheels with respect to the driven wheels.

SUMMARY OF THE INVENTION

The device according to the invention, which comprises means responsive to the speed differential of the driving wheels, means for converting the speed variations as sensed into corresponding axial shifts of at least a shiftable body equipped with means for retaining it in an idle position, and means for connecting said shiftable body to means for reducing the torque applied to the wheels, is characterized, in point of fact, in that said responsive means and said conversion means comprise a first rotatable member keyed to a shaft which is rotated at a speed proportional to that of the driving wheels, and a second rotatable member, which can also be shifted axially, integral with said shiftable body so as to be translated as an entity therewith, said rotatable members being maintained in a mutual rotary engagement, the latter being so embodied that, due to the inertia of the second member, every variation of the angular speed of the first member exceeding a predetermined limiting value, be converted into an axial shift of the second member and, therewith, of said shiftable body.

It is apparent that such a constructional arrangement, which exploits the inertia of the second named member for converting the speed variations as sensed into axial displacement forces of said second member and the shiftable body integral therewith, allows, on the one hand, greatly to simplify the assembly, and, on the other hand, enables the device to be used both for skiddings during acceleration and for those during braking. With such a constructional arrangement a device, which has been provided for overcoming skid during acceleration, can readily be converted into a device adapted to redress skiddings during braking, by merely connecting in an appropriate manner the shiftable body to a reducer of the braking torque rather than to a reducer of motive torque, and by possibly embodying the engagement between the two rotatable component parts so as to revert the direction of shift of the second member and the shiftable body as caused by a considerable reduction of the speed. In certain cases, as will become apparent hereinafter, one could even envisage to use both basic members of the device simultaneously, both to overcome skiddings during acceleration and skiddings during braking.

BRIEF DESCRIPTION OF THE DRAWINGS

The features and advantages of the present invention will become clearer upon a scrutiny of the ensuing detailed description of a few embodiments thereof, as illustrated in the accompanying drawings, wherein:

FIG. 3 is a view partly in elevation and partly in section illustrative of a device according to the invention for smoothing out both the skidding during acceleration and those during braking.

DETAILED DESCRIPTION OF THE EMBODIMENTS

Figure 1:
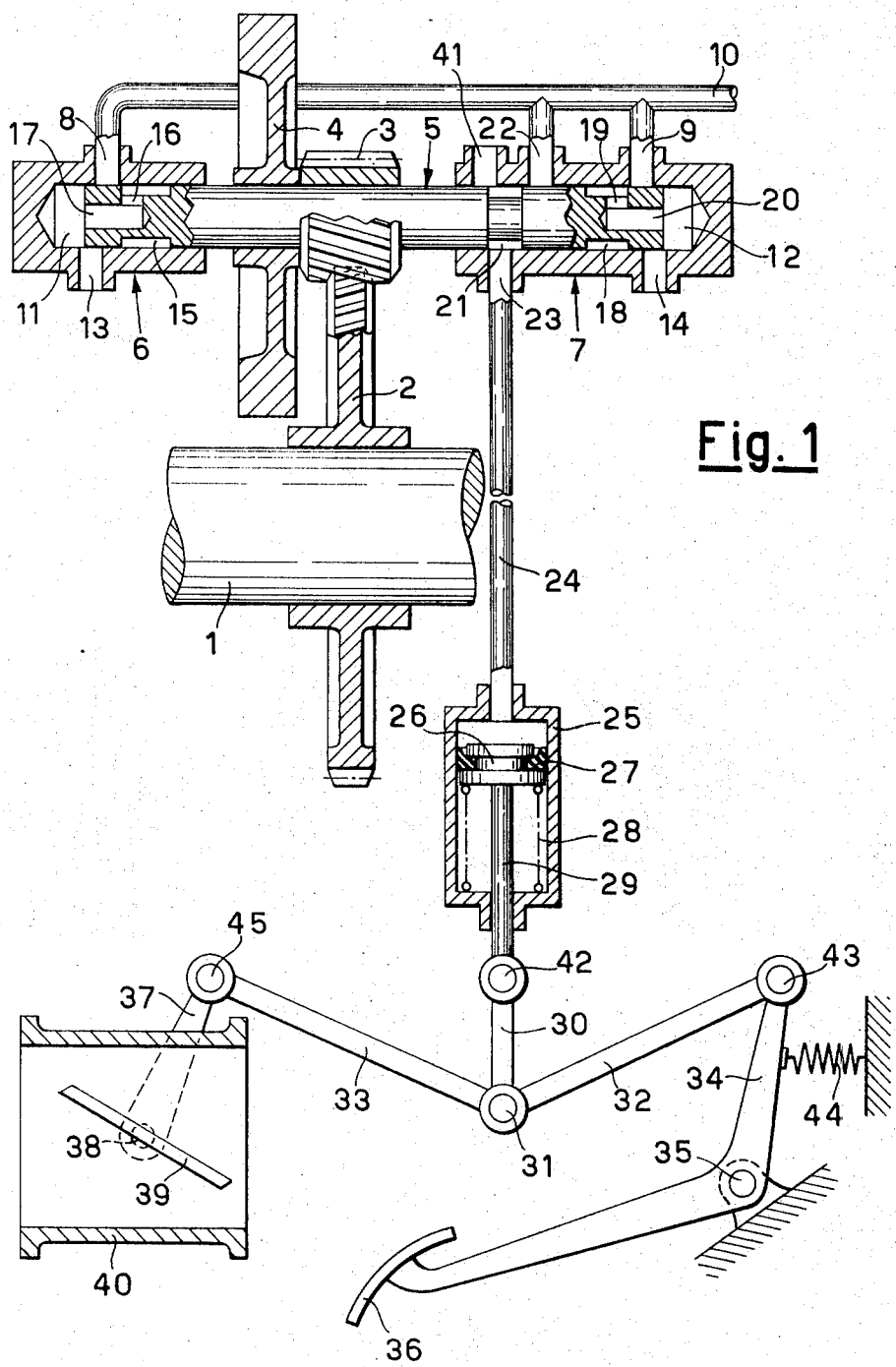
FIG. 1 is a view partly in elevation and partly in section illustrating a device according to the present invention for balancing the skidding movements during acceleration.

The device shown in FIG. 1 comprises a gear 2, having helical teeth, which is keyed to a shaft 1, with the latter being either the cardan shaft of the vehicle or any other shaft connected therewith or, at any rate, a shaft rotated at a speed which is proportional to the average of the angular speeds of the two driving wheels of the vehicle. The gear 2 is in mesh with a pinion 3 having an axial length longer than that of the gear 2, and which is keyed, along with a flywheel 4, to an arbor 5, the latter being borne, both rotatably and axially slidably, by fixed end bearings 6 and 7. The bearing 6 has an inner chamber 11, which can be placed into communication with a feeding port 8 connected to a duct 10 which, in turn, communicates with a source of oil under pressure, not shown in the drawing, or, as an alternative, with a discharge port 13 according to the axial position of the arbor 5, whose end housed in the bearing 6 is properly provided with an annular groove 15, intended for communication with the chamber 11 via both a radial passageway 16 and an axial passageway 17, and is positioned so as to be placed into communication with the feeding port 8 only after the communication between the chamber 11 and the discharge port 13 has been cut off, or simultaneously with said cutoff, and vice versa. The bearing 7, in turn, has an inner chamber 12, which can be placed into communication with a feeding port 9 (also connected with the duct 10), or, as an alternative, with a discharge port 14 as a function of the axial position of the arbor 5, whose end as engaged in the bearing 7, is appropriately provided with an annular groove 18, which communicates with the chamber 12 via a radial passageway 19 and an axial passageway 20 and is so positioned as to be able to be placed in communication with the feeding port 9 only after the cutoff of the communication between the chamber 12 and the discharge port 14, or simultaneously with said cutoff, and vice versa. The bearing 7, moreover, has a feeding port 22 (this also is connected to the duct 10) and a discharge port 41, which can be placed alternatingly in communication with an additional port 22 as a function of the axial position of the arbor 5, the latter being provided, to this end, with an annular groove 21. The port 23 is connected by a duct 24 to the internal chamber of a cylinder 25, in whose interior slides a piston 26 equipped with a piston ring 27 and a retaining spring 28. At one end of a stem or rod 29 of piston 26 is hingedly mounted, at 42, one end of a link rod 30, whose other end is pivotally connected, at 31, with the corresponding ends of two connecting rods 32 and 33. At the other end of the rod 32, at 43, there is pivoted one end of a bell-crank lever 34, which has a fixed pivotal point 35 and carries, at the other end, an accelerator pedal 36, by whose agency it can be shifted angularly against the bias of a return spring 44 (a condition in which the accelerator has been partially depressed has been shown in the drawing). To the other end of the rod 33 is pivotally connected, instead, a lever 37 which is fulcrumed to an arbor 38 and rotates as an entity therewith, the arbor 38 having also, integral therewith, a throttle 39 as inserted in intake duct 40 of the vehicle engine.

In operation, until such time as the shaft 1 is maintained at a constant, or almost constant, speed (the limit is essentially defined by the moment inertia of the assembly consisting of the pinion 3, flywheel 4 and arbor 5), no axial shifting thrust is transferred between the gear 2 and pinion 3 to the arbor 5, the latter thus remaining in the at rest position shown FIG. 1; the duct 24 is then connected with the discharge port 41, so that the piston 26 is maintained in the at rest position as defined by the spring 28, and the angular position of the throttle 39 is only determined by the more or less marked depression of the accelerator pedal 36. If conversely, at a certain stage, the shaft 1 undergoes a variation of angular speed which exceeds the minimum limit as defined hereinabove, the helical teeth mesh between the gear 2 and the pinion 3 causes an axial thrust to be applied to the arbor 5, said thrust being directed either towards the right or towards the left as viewed in FIG. 1 according to whether an acceleration, or a deceleration of the shaft 1 is experienced. If, the shaft 1 has undergone an acceleration, the arbor 5 is shifted towards the right and originates two different modes of operation according to whether the acceleration which has been sensed is below or above a certain maximum threshold value, beyond which the wheels begin to skid. In the first case, the axial force acting upon the arbor 5 is such as to enable the latter to close the discharge port 14 and to establish a communication between the feeding port 9 and the annular groove 18 and thus also with the chamber 12, but not such as to overcome the oil back-pressure originated in the chamber 12 nor to arrive to close the discharge port 41 and establish a communication between the ports 22 and 23 through the annular groove 21, so that the above mentioned displacement of the arbor 5 has no influence on the piston 26 and thus also on the throttle 39, the displacement being conversely neutralized at once, by the pressure existing in the chamber 12, there is thus an automatic smoothing-out of the small speed oscillations which can be produced as the motor vehicle travels. If, on the contrary, the acceleration of the shaft 1 exceeds the threshold abovementioned (that is, if the wheels skid), then the axial force acting upon the arbor 5 is such as to overcome the reactional force due to the oil under pressure as introduced in the chamber 12 and to arrive to close the port 41, thus establishing a communication between the ports 22 and 23. The oil pressure as established in the duct 24 then causes the piston 26 to be depressed and consequently the end 42 of the link rod 30 is also depressed. Since the opposite end 31 must obviously be kept always at the same distance from the hinge points 43 and 45 and the point 43 is maintained virtually stationary by the combined actions of the spring 44 and the driver's foot pressed on the pedal 36, the end 31 is shifted towards the right and downwards, thus originating a clockwise rotation of the lever 37 and the throttle 39, which thus is closed (even if the accelerator pedal is fully depressed) and the cause of skidding is thus removed. The pressure obtaining in the chamber 12, in combination with the consequential deceleration of the shaft 1, then provides to bring the arbor 5 back to its at rest position and thus, due to the effect of the closure of the port 22 and the communication between the ports 23 and 41, the piston 26 is also restored to its at rest position. Should the shaft 1 have undergone a deceleration, the arbor 5 is consequently shifted leftwards, closing the discharge port 13 and causing the feeding port 8 to communicate with the annular groove 15 and thus with the chamber 11: the oil pressure thus generated within the chamber 11 acts then upon the end of the arbor 5 so as to restore the latter to its at rest position immediately.

Figure 2:
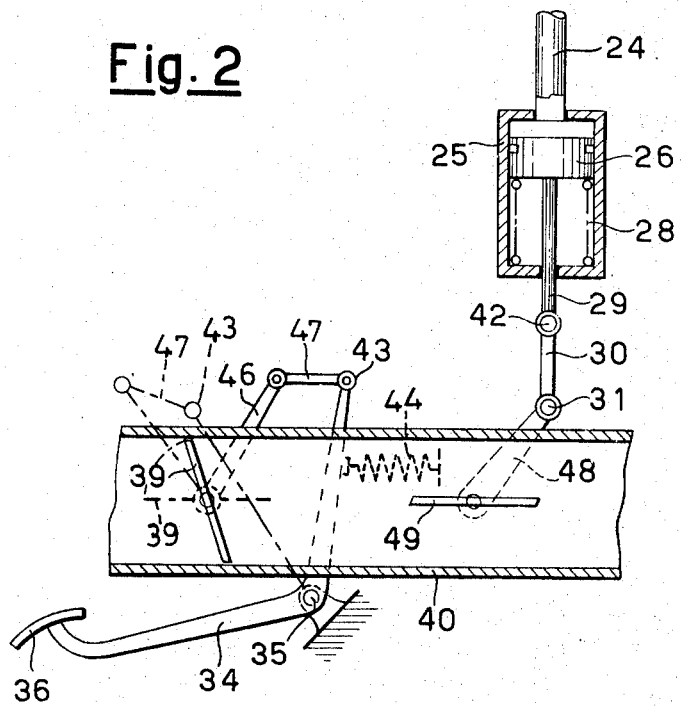
FIG. 2 is a view similar to FIG. 1 showing a modification introduced in the terminal portion, that is, the step of reducing the motive torque, of the device of FIG. 1.

FIG. 2 illustrates a modification of the device of FIG. 1, according to which the piston 26, rather than acting upon the throttle 39 (rigidly fixed to lever 46 which is connected to the lever 34 through a connecting rod 47), acts through the link rod 30 on a lever 48 which is integral with another throttle 49 positioned downstream of the main throttle 39 in the intake duct 40. Obviously, no substantially changes can be seen in the operation of the device.

Likewise, one might think of dispensing with the assembly cylinder 25-piston 26 (and thus also the duct 24, the ports 22, 23 and 41 and the groove 21), by replacing it with a purely mechanical linkage between the arbor 5 and the throttle 39 (or 49).

In addition, the device of FIG. 1 can readily be converted into an antiskid device during braking, by merely embodying an appropriate connection between the arbor 5 and a braking-power reducer. For example, it could suffice appropriately to connect the piston 26 to a limiting device for the braking pressure and then to arrange at the left, rather than at the right, the ports 22, 23 and 41 and the groove 21 (so that a wide shift towards the left be experienced by the arbor 5, due to a large deceleration of the shaft 1, in order to actuate the piston 26), or, as an alternative and still more simply, to reverse the slope of the helical teeth which couple the gear 2 and the pinion 3, so that the decelerations of the shaft 1 will cause the shift of the arbor 5 towards the right.

Lastly, it also possible simultaneously to utilize a device such as that shown in FIG. 1 both for overcoming the skid during acceleration and the during braking. A device of the latter kind is, for example, shown in FIG. 3, where it can be seen that such a device comprises a helical gear 52 keyed to a shaft 51 (still consisting of the cardan shaft or another shaft connected therewith) and in mesh with a helical-tooth pinion 53 keyed, along with a flywheel 54, to a shaft 55 borne in a rotatable and axially displaceable manner by two bearings 56 and 57. The arbor 55 has a cup-shaped end 58, which houses (retained by a Seeger washer 59) a bearing 60 which, with the aid of a nut 61, acts as a connection member between the arbor 55 and an additional arbor 62, the latter carrying three pistons 63, 64 and 65 (the first and the third of which have axial bores 66 and 67) slidable in a cylinder 68. The latter has a first couple of symmetrical bores 69, 70 connected with a discharge duct 71, a second pair of symmetrical bores 72, 73 connected to a duct 74 for feeding oil under pressure, and, lastly, a third pair of symmetrical bores 75, 76 arranged in positions which are intermediate between the bores 69–72 and 70–73, respectively. The bore 75 is connected, by a duct 77, to an acceleration-reducing assembly which is the exact counterpart of the one shown in FIG. 1 (corresponding parts being identified with the numerals 78–97 in the same order as the component parts of FIG. 1 have been identified with the numbers 25–40 and 42–45). The bore 76, conversely, is connected by a duct 98 to a braking-power-reducing assembly which comprises a cylinder 99 communicating with the duct 98, a piston 100 having a piston ring 101, a return spring 102 and a stem or rod 103, an additional cylinder 104 integral with a cross 105 of the braking system and communicating through a bore 106 with a braking fluid intake duct 107 coming from the brake pump (not shown) and with ducts 108 and 109 carrying the braking fluid to the wheels. A piston 110 is slidably housed within the cylinder 104 and is equipped with a piston ring 111, a return spring 112 and a stem or rod 113 and, finally, a lever 114 for connecting the stems 103 and 113 and which is fulcrumed at 115.

The device, which has the function of regulating both the driving torque and the braking torque as applied to the wheels, is shown in the drawing in its "neutral" position, with the pistons 63, 64, 65 in equilibrium under the action of the hydraulic pressures acting upon the piston faces, since the average accelerations or decelerations of the driving wheels lower than the value at which the device enters action. The rod 62, as supported by the cup-shaped extension 58 of the arbor 55 by means of the bearing 60, remains stationary, whereas the arbor rotates at a speed which is proportional to that of the arbor 51.

When the speed variation of the driving wheels exceeds the value at which the device enters action, a value which is a function of the size of the several component parts, the circumferential forces due to the masses rotated at a variable speed, more particularly that of the flywheel 54, give rise to an axial component of the thrust between the helical teeth of the gear 52 and pinion 53, which is capable of shifting the arbor 55 and thus, through the thrust bearing 60, the arbor 62 and the pistons 63, 64 and 65. In the example shown in the drawing, the slope of the teeth of the pinion 53 and the gear 52 is such that the decelerations generate axial thrusts which shift towards the left the slider 116 composed by the pistons aforementioned and the reduced cross-section portions connecting same. The piston 65, by being displaced, uncovers the feeding port 73 causing oil under pressure to fill the chamber defined between the pistons 65 and 64, from which the oil under pressure reaches the chamber at the leftof the piston 65, through the bore 67, and also the duct 98; simultaneously, also the piston 64 is shifted towards the left and masks the discharge port 70. Conversely, since the piston 63 has been shifted towards the left, the bore 72 still remains obstructed; the duct 77 still communicates with the discharge port 69 by leaving the portion of the device relative to the adjustment of the driving torque inactive. The oil under pressure which flows towards the cylinder 99 shifts the piston 100 leftwards, against the bias of the spring 102; on account of the presence of the lever 114, the piston 110 is moved towards the right, thus causing the space available to the fluid in the braking circuit to be increased and reducing the pressure within said circuit, even though the brake pedal has been fully depressed. The wheels begin to revolve again and skidding is overcome, inasmuch as the adherence between the tires and the ground is restored. As a result, the decelerations are decreased down to a value at which the axial thrust, which had forwarded the arbor towards the left, falls. The force exerted by the oil under pressure, which entered the area at the left of the piston 65, on the face of the piston itself, is no longer biased by the axial force due to deceleration and thus shifts the slider 116 towards the right and restores it to its position of equilibrium: the hole 73 is masked and the discharge port 70 is placed in communication with the areas which had been previously filled in the internal cavity of the cylinder 68, and also with the duct 98, so that the oil under pressure flows towards the discharge duct 71.

If exceedingly high accelerations of the wheels are conversely experienced, an axial force is originated, which displaces the slider 116 towards the right: the piston 64 intercepts the discharge port 69, whereas the piston 63 unmasks the port 72 so that the oil under pressure flows into the chamber defined between the pistons 64 and 63 and, therefrom, into the duct 77 and, through the port 66, into the chamber at the right of the piston 63. The oil under pressure which flows towards the cylinder 78 displaces the piston 79 against the bias of the spring 81, thus causing the angle of inclination between the rods 85 and 86 to be increased; the throttle 92 will thus be rotated towards the closed position even if the accelerator pedal is fully depressed, so that the driving torque diminishes and wheel skid is overcome. As the cause which had originated it disappears, the axial thrust falls, the fluid pressure acting on the right face of the piston 63 displaces the slider towards the left, i.e. towards the equilibrium position, intercepting the port 72 and establishing a communication between the discharge duct 71 and the duct 77 as well as the chamber which had been previously filled with oil.

It should be noticed that the regulating action, both during the braking and acceleration, is proportional to the magnitude of the phenomenon which originated it. As a matter of fact, the force originated by speed differentials is proportional to the magnitude of the variation and causes the slider to be displaced from its "neutral" position by an amount which is proportional to said magnitude, by unmasking a more or less wide portion of the induction holes 72 and 73 and determining, as a result, the magnitude of the adjustment action.

It should be noticed, moreover, that the pinion 53 and the flywheel 54 could be mounted in a portion of the rod 62 intermediate between the pistons 63 and 65, so that the same rod and the slider would be rotated at a speed proportional to that of the cardan shaft, in addition to going over axial displacements whenever the action of the adjustment device is required; the choice of either solution depends on the possibility of lubrication for the pistons of the slider, a lubrication which should be particularly efficient if the pistons are rotated at a rather high speed.

What is claimed is:

1. An antiskid device for motor vehicles having wheels, at least some of which wheels are driving wheels, comprising means responsive to the speed differentials of the driving wheels, a shiftable body having retaining means for retaining said body in an idle position, means for converting the speed variations as sensed into corresponding axial shifts of at least said shiftable body, means for reducing the torque applied to the wheels, and means for connecting said shiftable body to said means for reducing the torque applied to the wheels, the improvement that said responsive means and said conversion means include a first rotatable helically toothed gear, a shaft rotated at a speed proportional to that of the driving wheels, said first gear being keyed to said shaft, a second rotatable helically toothed gear having a substantial inertia in engagement with the first gear, and said second gear being coupled to the shiftable body to be axially moved as an entity therewith, the arrangement being such that until the motor vehicle runs at a substantially constant speed, the second gear rotates synchronously with the first gear and is not axially moved, yet if the motor vehicle undergoes an acceleration or deceleration exceeding a threshold value depending on the inertia of the second gear, the second gear rotates synchronously with the first gear, but is also axially moved to impart a similar axial movement to the shiftable body, to which it is coupled.

2. The device according to claim 1, characterized in that a flywheel is integrally affixed to said second gear.

3. The device according to claim 1 characterized in that said second gear is directly keyed to said shiftable body.

4. The device according to claim 3, characterized in that said shiftable body is a slider which slides within a hollow body, said slider and said hollow body being so constructed that every displacement of the slider from its neutral position establishes a communication between a source of fluid pressure and a torque-reducing mechanism.

5. The device according to claim 4, characterized in that it comprises a driving-torque-reducer and a braking-torque-reducer which are hydraulically connected to said hollow body so as to be out in alternate communication with said source of fluid pressure as a function of the displacements of the slider in either direction with respect to the neutral position.

6. The device according to claim 1 characterized in that said second gear is keyed onto a rotatable arbor which is axially shiftable and is integral with said shiftable body so as to transfer the axial displacements only.

* * * * *